(12) United States Patent  
Sao et al.

(10) Patent No.: US 8,840,233 B2
(45) Date of Patent: *Sep. 23, 2014

(54) INK JET RECORDING-TARGETED NON-AQUEOUS INK COMPOSITION, INK SET, AND INK JET RECORDING METHOD

(75) Inventors: Akihito Sao, Matsumoto (JP); Kenichiro Kubota, Shiojiri (JP); Ito Maki, Shiojiri (JP)

(73) Assignee: Seiko Epson Corporation (JP)

( * ) Notice: Subject to any disclaimer, the term of this patent is extended or adjusted under 35 U.S.C. 154(b) by 9 days.

This patent is subject to a terminal disclaimer.

(21) Appl. No.: 13/213,171

(22) Filed: Aug. 19, 2011

(65) Prior Publication Data

US 2012/0056929 A1 Mar. 8, 2012

(30) Foreign Application Priority Data

Sep. 3, 2010 (JP) ................. 2010-197483

(51) Int. Cl.
*B41J 2/01* (2006.01)
*C09D 11/322* (2014.01)
*C09D 11/36* (2014.01)

(52) U.S. Cl.
CPC .............. *C09D 11/322* (2013.01); *C09D 11/36* (2013.01)
USPC ....................................................... 347/100

(58) Field of Classification Search
USPC ....................................................... 347/100
See application file for complete search history.

(56) References Cited

U.S. PATENT DOCUMENTS

| | | | |
|---|---|---|---|
| 3,914,303 A | 10/1975 | Daniher et al. | |
| 4,270,917 A | 6/1981 | Heald et al. | |
| 6,362,348 B1 | 3/2002 | Takahashi et al. | |
| 7,156,909 B2 | 1/2007 | Oyanagi et al. | |
| 7,172,648 B2 | 2/2007 | Ichikawa | |
| 7,414,082 B2 | 8/2008 | Hirasa et al. | |
| 7,488,763 B2 | 2/2009 | Ushiku et al. | |
| 7,897,657 B2 | 3/2011 | Nakano et al. | |
| 8,338,645 B2 | 12/2012 | Shiraki et al. | |
| 8,440,745 B2 | 5/2013 | Kotera et al. | |
| 8,557,032 B2 | 10/2013 | Sugita et al. | |
| 2002/0019458 A1 | 2/2002 | Hirasa et al. | |
| 2004/0119801 A1 | 6/2004 | Suzuki et al. | |
| 2006/0092249 A1 | 5/2006 | Chung et al. | |
| 2007/0107146 A1 | 5/2007 | Egli | |
| 2008/0097013 A1 | 4/2008 | Mizutani | |
| 2009/0047484 A1 | 2/2009 | Kitamura et al. | |
| 2009/0295847 A1* | 12/2009 | Mukai et al. ............. | 347/6 |
| 2010/0076223 A1 | 3/2010 | Shiraki et al. | |
| 2011/0263898 A1 | 10/2011 | Guglieri et al. | |
| 2011/0292114 A1 | 12/2011 | Sao et al. | |
| 2011/0292141 A1 | 12/2011 | Sao et al. | |
| 2012/0056929 A1 | 3/2012 | Sao et al. | |
| 2012/0249666 A1 | 10/2012 | Maki et al. | |

FOREIGN PATENT DOCUMENTS

| | | | |
|---|---|---|---|
| EP | 1867690 A1 | 12/2007 | |
| EP | 1892271 A1 | 2/2008 | |
| EP | 2123631 A1 * | 11/2009 | .............. C07B 67/00 |
| JP | 48-014888 | 2/1973 | |
| JP | 50-0094058 | 7/1975 | |
| JP | 50-100386 | 8/1975 | |
| JP | 54-002484 | 1/1979 | |
| JP | 55-054353 | 4/1980 | |
| JP | 61-213273 | 9/1986 | |
| JP | 08-127981 | 5/1996 | |
| JP | 10-158556 | 6/1998 | |
| JP | 11-335608 | 12/1999 | |
| JP | 2002-167536 A | 6/2002 | |
| JP | 2003-201428 A | 7/2003 | |
| JP | 2004-197046 A | 7/2004 | |
| JP | 2004-250353 A | 9/2004 | |
| JP | 2004-292468 A | 10/2004 | |
| JP | 2005-15672 A | 1/2005 | |
| JP | 2005-047885 A | 2/2005 | |
| JP | 2006-124855 A | 5/2006 | |
| JP | 2007-146002 A | 6/2007 | |
| JP | 2007-177160 A | 7/2007 | |
| JP | 2007-256485 A | 10/2007 | |
| JP | 2007-291257 A | 11/2007 | |
| JP | 2008-013714 A | 1/2008 | |
| JP | 2008-163238 A | 7/2008 | |
| JP | 2008-238031 A | 10/2008 | |
| JP | 2008-260944 A | 10/2008 | |
| JP | 2008-274034 A | 11/2008 | |
| JP | 2008274034 A * | 11/2008 | .............. C09D 11/00 |
| JP | 2009-074034 A | 4/2009 | |
| JP | 2009-191221 A | 8/2009 | |
| JP | 2009-227813 A | 10/2009 | |
| JP | 2009-242649 A | 10/2009 | |
| JP | 2010-180332 A | 8/2010 | |
| JP | 2010180332 * | 8/2010 | .............. C09D 11/00 |

(Continued)

OTHER PUBLICATIONS

Patent Abstracts of Japan 2005-15672A Published Jan. 20, 2005 and Machine English Translation.

(Continued)

*Primary Examiner* — Laura Martin
(74) *Attorney, Agent, or Firm* — Harness, Dickey & Pierce, P.L.C.

(57) ABSTRACT

An ink jet recording-targeted non-aqueous ink composition contains pigment, polyvinyl chloride, and a solvent represented by the formula 1,

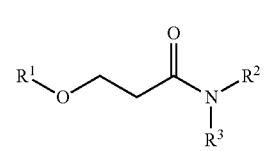

(1)

wherein $R^1$ represents an alkyl group having one to eight carbon atoms, and $R^2$ and $R^3$ each represent any one of a methyl group and an ethyl group.

7 Claims, No Drawings

(56) References Cited

FOREIGN PATENT DOCUMENTS

| JP | 2012-046671 A | 3/2012 |
|---|---|---|
| WO | WO-02-055619 A1 | 7/2002 |
| WO | WO-2004-035690 A1 | 4/2004 |
| WO | WO-2006-075373 A1 | 7/2006 |
| WO | WO-2009-133181 A1 | 11/2009 |

OTHER PUBLICATIONS

Patent Abstracts of Japan 2008-238031A Published Oct. 9, 2008 and Machine English Translation.

Patent Abstracts of Japan 2008-274034A Published Nov. 13, 2008 and Machine English Translation.

Chemical Abstracts Service, Columblus, Ohio, USA; Hazama, Seiji: "Nonaqueous Ink Compositions Containing Beta-Alkozypropanamides Useful for Jet-Printing" Database Accession No. 2010:1035182.

Chemical Abstracts Service, Columbus, Phio, USA; Yoshio, Kehei; Haya Shi Eiji: "Liquid Crystal Alignment Agent, Alignment Film, and Liquid Crystal Display Element" Database Accession No. 2007:1096682.

Database WPI, Week 197716, Thomson Scientific, AN1977-27746Y.

Database WPI, Week 201059, Thomson Scientific, AN 2010-K58621.

European Search Report for Application No. 11167244.0 dated Aug. 1, 2011.

Soeda et al., "Development of Solubilized Disperse Dye Ink", Bulletin of Tokyo Metropolitan Industrial Technology Research Institute, Jan. 2006, No. 1, pp. 74-75 (with English translation).

Extended European Search Report for Application No. EP 11 16 7243 dated Sep. 30, 2011 (4 pages).

* cited by examiner

INK JET RECORDING-TARGETED NON-AQUEOUS INK COMPOSITION, INK SET, AND INK JET RECORDING METHOD

Priority is claimed under 35 U.S.C §119 to Japanese Application No. 2010-197483 filed on Sep. 3, 2010, which is hereby incorporated by reference in its entirety.

BACKGROUND

1. Technical Field

The present invention relates to an ink jet recording-targeted non-aqueous ink composition, an ink set, and an ink jet recording method.

2. Related Art

In typical ink jet recording, fine ink droplets are ejected from the nozzle of an ink jet recording head, thereby recording images and characters. Such ink jet recording has been mainly utilized in recording onto a surface of a water-absorbing recording medium such as paper. An aqueous ink in which a colorant such as a water-soluble dye is added to water is widely utilized as an ink jet ink which is used in such ink jet recording. Meanwhile, in recent years, the ink jet recording has come to be utilized for recording onto surfaces of various types of recording media in various fields. In order to perform the recording onto surfaces of various types of recording media, a non-aqueous ink which does not substantially contain water as a solvent has been therefore developed in place of an aqueous ink.

Specific examples of such a non-aqueous ink include a non-aqueous ink proposed in JP-A-2005-15672, which contains an organic solvent in which polyvinyl chloride can be dissolved, pigment, and resin in order to improve adhesiveness to vinyl chloride-based resin. In addition, another non-aqueous ink composition is proposed in JP-A-2008-274034, which contains a pigment, organic solvent, polyvinyl chloride, and anti-dehydrochlorination reaction agent in order to securely perform adequate printing to vinyl chloride-based resin.

Meanwhile, because an ink which contains a dispersion medium such as resin or pigment is a so-called dispersed system, it is known that such an ink exhibits thixotropic nature. It is believed that the thixotropic nature is caused by the structural change of association due to hydrogen bond of a polar solvent to a dispersed material or is caused by the change of the conformation of resin. Furthermore, it is known that the thixotropic nature has an influence on ink ejection stability during formation of ink droplets in the ink jet recording (particularly in the case of utilizing high frequency, see JP-A-2008-238031).

The typical non aqueous ink is provided assuming that recording is performed to a vinyl chloride-based resin, and a specific solvent such as symmetric glycol diether (glyme) or N-methylpyrrolidone therefore needs to be used. In the case of using such a specific solvent, thixotropic nature adequate to secure ink ejection stability may be unfortunately reduced, and good ejection stability is therefore less likely to be secured.

In an ink set including the typical non-aqueous ink, light resistance may vary depending on the type of pigment to be added. In the case where the ink set partially includes a non-aqueous ink containing a pigment which exhibits small light resistance, the color balance of characters and images which are recorded on a recording medium may be reduced.

SUMMARY

In terms of overcoming the above disadvantages, an advantage of some aspects of the invention is that it provides an ink jet recording-targeted non-aqueous ink composition and provides an ink set including such an ink composition, the ink jet recording-targeted non-aqueous ink composition exhibiting excellent ejection stability and enabling the light resistance of pigment to be enhanced. In addition, another advantage of some aspects of the invention is that it provides an ink jet recording method in which the ink jet recording-targeted non-aqueous ink composition is used.

Embodiments of the invention are provided in order to overcome at least part of the above problems and have the following advantages and inventiveness.

According to a first aspect of the invention, there is provided an ink jet recording-targeted non-aqueous ink composition containing pigment, polyvinyl chloride, and a solvent represented by the formula 1.

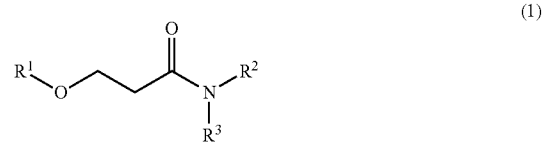

In the formula 1, $R^1$ represents an alkyl group having one to eight carbon atoms, and $R^2$ and $R^3$ each represent a methyl group or an ethyl group.

In the ink jet recording-targeted non-aqueous ink composition of the first aspect, the solvent represented by the formula 1 is contained, thereby being able to provide good ejection stability. In the case where the pigment has small light resistance, the light resistance of the pigment can be enhanced as a result of the interaction of the pigment with polyvinyl chloride which is dissolved in the solvent represented by the formula 1.

In the ink jet recording-targeted non-aqueous ink composition according to the first aspect, it is preferable C.I. pigment yellow 180 is employed as the pigment.

In the ink jet recording-targeted non-aqueous ink composition having such inventiveness, the C.I. pigment yellow 180 which has small light resistance interacts with the polyvinyl chloride which is dissolved in the solvent represented by the formula 1, thereby being able to improve the light resistance of the C.I. pigment yellow 180.

In the ink jet recording-targeted non-aqueous ink composition having any of the above inventiveness, it is preferable that $R^1$ in the formula 1 which represents the solvent is a methyl group or an n-butyl group.

In the ink jet recording-targeted non-aqueous ink composition having any of the above inventiveness, it is preferable that the solvent represented by the formula 1 is contained in an amount that is in the range from 2 to 50% by mass.

In the ink jet recording-targeted non-aqueous ink composition having any of the above inventiveness, it is preferable that the polyvinyl chloride is contained in an amount that is in the range from 0.05 to 5% by mass.

In the ink jet recording-targeted non-aqueous ink composition having any of the above inventiveness, it is preferable that the polyvinyl chloride and the solvent represented by the formula 1 are contained in a mass ratio that is in the range from 1:5 to 1:25.

According to a second aspect of the invention, there is provided an ink set including a plurality of ink jet-recording targeted non-aqueous ink compositions and including at least one ink jet-recording targeted non-aqueous ink composition having any of the above inventiveness.

By virtue of the ink set of the second aspect, even in the case where the ink set includes the non-aqueous ink composition which contains pigment having small light resistance, the light resistance of the pigment can be enhanced. The color balance of characters and images which are recorded on a recording medium can be effectively prevented from being reduced.

According to a third aspect of the invention, there is provided an ink jet recording method including: ejecting droplets of the ink jet recording-targeted non-aqueous ink composition having any of the above inventiveness; and then bringing the droplets into adhering onto a surface of a recording medium containing a vinyl chloride-based resin with the result that images are recorded.

In the ink jet recording method of the third aspect, because the ink jet recording-targeted non-aqueous ink composition is used, the ink composition can be securely ejected from an ink jet head with good stability, and the color balance of characters and images which are recorded on a recording medium can be effectively prevented from being reduced. Furthermore, the non-aqueous ink composition contains the solvent represented by the formula 1, and the solvent interacts with a vinyl chloride-based resin. An image is therefore formed as a result of bringing the droplets of the non-aqueous ink composition into adhering onto a surface of a recording medium which contains the vinyl chloride-based resin, thereby being able to firmly fix the image onto the recording medium.

DESCRIPTION OF EXEMPLARY EMBODIMENTS

The preferred embodiments of the invention will be hereinafter described in detail. The following embodiments will be provided to describe an example of embodiments of the invention. Furthermore, embodiments of the invention are not limited to the following embodiments and may be variously modified without departing from the scope of the invention.

1. Ink Jet Recording-Targeted Non-Aqueous Ink Composition

The ink jet recording-targeted non-aqueous ink composition of an embodiment of the invention (hereinafter referred to as "non-aqueous ink composition", simply) at least contains pigment, polyvinyl chloride, and a specific solvent which will be hereinafter described. The term "non-aqueous ink composition" as used herein means that water is not positively added during production of the ink composition, and the ink composition may contain a slight amount of moisture which is inevitably mixed during the production of the ink composition or during preservation thereof.

Ingredients used in this embodiment will be hereinafter described in detail.

1.1. Solvent

The non-aqueous ink composition of this embodiment at least contains the solvent represented by the formula 1.

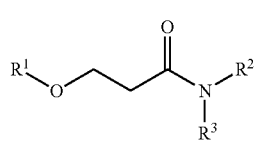

(1)

The inventors have intensely studied to find the following: in the formula 1, $R^1$ preferably represents an alkyl group having one to eight carbon atoms, and $R^2$ and $R^3$ each preferably represent a methyl group or an ethyl group. The term "alkyl group having one to eight carbon atoms" as used herein refers to an alkyl group having a straight-chain structure or branched structure. Examples of such an alkyl group include a methyl group, ethyl group, n-propyl group, iso-propyl group, n-butyl group, iso-butyl group, sec-butyl group, tert-butyl group, n-pentyl group, iso-pentyl group, sec-pentyl group, tert-pentyl group, n-hexyl group, iso-hexyl group, sec-hexyl group, tert-hexyl group, n-heptyl group, iso-heptyl group, sec-heptyl group, tert-heptyl group, n-octyl group, iso-octyl group, sec-octyl group, and tert-octyl group. The non-aqueous ink composition which contains the solvent represented by the formula 1 can serve to secure good ink ejection stability. It is believed that the solvent represented by the formula 1 contributes to imparting an appropriate thixotropic nature to ink. The solvent represented by the formula 1 exhibits high compatibility with polyvinyl chloride. The polyvinyl chloride which has been dissolved in the solvent represented by the formula 1 therefore interacts with pigment, thereby being able to enhance the light resistance of the pigment.

The solvent represented by the formula 1 exhibits a hydrophile-lipophile balance (HLB) value that is in the range from 8.0 to 20.0, preferably in the range from 8.5 to 18.5, more preferably in the range from 12.0 to 18.5. In terms of the compatibility with polyvinyl chloride, the solvent which is represented by the formula 1 so as to exhibit the HLB value that falls within such ranges is preferably employed. The term "HLB value" as used herein refers to a value which can be obtained from the following formula 2 based on the ratio of an inorganic value (I) to an organic value (O) (hereinafter referred to as "I/O value", simply) in an organic conceptual diagram.

$$\text{HLB value} = [\text{inorganic value}(I)/\text{organic value}(O)] \times 10 \quad (2)$$

In particular, the I/O value can be calculated with reference to the following literature: Atsushi, Fujita. *Keitouteki Yuukiteiseibunseki Kongoubutsuhen*. Kazamashobo Co., Ltd., 1974; Nobuhiko, Kuroki. *Senshoku rironkagaku*. Shinshoten, 1966; and Hiroo, Inoue. *Yuukikagoubutsu bunrihou*, SHOKABO PUBLISHING Co., Ltd., 1990.

The solvent represented by the formula 1 is contained in the non-aqueous ink composition of this embodiment in an amount that is preferably in the range from 2 to 50% by mass, more preferably 10 to 50% by mass. The solvent represented by the formula 1 is contained in an amount that falls within such ranges, thereby being able to secure ink ejection stability. In addition, the solvent represented by the formula 1 is contained in an amount that falls within such ranges, so that polyvinyl chloride can be dissolved in an amount adequate to contribute to enhancing the light resistance of pigment.

1.2. Polyvinyl Chloride

The non-aqueous ink composition of this embodiment at least contains polyvinyl chloride. Polyvinyl chloride can be dissolved into the solvent represented by the formula 1. Polyvinyl chloride which has been dissolved into the solvent represented by the formula 1 therefore interacts with pigment, thereby being able to enhance the light resistance of the pigment. To the contrary, in the case where polyvinyl chloride is not dissolved, the polyvinyl chloride cannot sufficiently interact with the pigment, and the light resistance of the pigment cannot be enhanced.

The term "polyvinyl chloride" as used herein not only means a homopolymer produced from a vinyl chloride monomer but means a copolymer produced from the vinyl chloride monomer and other monomers (for example, vinyl acetate monomer).

Although the average polymerization degree of the polyvinyl chloride is not specifically limited, the polyvinyl chloride exhibits an average polymerization degree that is preferably in the range from 300 to 1500, more preferably 400 to 1100. In the case where the polyvinyl chloride which exhibits the average polymerization degree greater than 1500 is added, the viscosity of the non-aqueous ink composition is likely to be increased, and ink ejection stability cannot be therefore secured in some cases. In addition, the polyvinyl chloride which exhibits the average polymerization degree greater than 1500 is less likely to be dissolved into the solvent represented by the formula 1, and an effect in which the light resistance of the pigment is enhanced may be therefore reduced. Furthermore, in the case where polyvinyl chloride exhibits an average polymerization degree less than 300, an effect in which the light resistance of the pigment is enhanced may be also reduced. The average polymerization degree of polyvinyl chloride can be obtained on the basis of a method for calculating an average polymerization degree, which is described in a remarks column of "JIS K 6720-2".

The polyvinyl chloride is contained in the non-aqueous ink composition of this embodiment in an amount that is preferably in the range from 0.05 to 5% by mass, more preferably in the range from 0.5 to 5% by mass. Polyvinyl chloride content falls within such ranges with the result that the polyvinyl chloride which is dissolved into the solvent represented by the formula 1 interacts with pigment, thereby being able to provide an effect in which the light resistance of the pigment can be enhanced. In the case where the polyvinyl chloride content falls below such ranges, the effect in which the light resistance of the pigment can be enhanced may fall into insufficiency. In contrast, in the case where the polyvinyl chloride content exceeds such ranges, polyvinyl chloride may be deficiently dissolved, and the ejection stability may be therefore reduced, for example, with the result that nozzle clogging occurs.

In the non-aqueous ink composition of this embodiment, the polyvinyl chloride and the solvent represented by the formula 1 are preferably contained in a mass ratio that is in the range from 1:5 to 1:25. Within such a range of the mass ratio, because the polyvinyl chloride can be easily dissolved in the solvent represented by the formula 1, the light resistance of the pigment can be enhanced, and the nozzle clogging is less likely to occur.

1.3. Pigment

The non-aqueous ink composition of this embodiment at least contains pigment as a colorant. Organic or inorganic colored pigments which have been typically used for the traditional non-aqueous ink compositions can be used as the pigment. In the non-aqueous ink composition of this embodiment, although any type of pigment can be used to enhance light resistance, use of a pigment which exhibits small light resistance particularly enables such an enhancement effect to be effectively provided.

Examples of the pigment include azo pigments such as azo lake, an insoluble azo pigment, a condensed azo pigment, and a chelate azo pigment; polycyclic pigments such as phthalocyanine pigment, perylene or perinone pigment, anthraquinone pigment, quinacridone pigment, dioxazine pigment, thioindigo pigment, isoindolinone pigment, and quinophthalone pigment; dye-type lake such as basic dye-type lake and acid dye-type lake; organic pigments such as nitro pigment, nitroso pigment, aniline black, and daylight fluorescent pigment; and inorganic pigment such as carbon black. Although the average primary particle size of pigment particles is not specifically limited, the pigment particles preferably have an average primary particle size that is in the range from 50 to 500 nm.

In the case where the non-aqueous ink composition of this embodiment is produced in the form of a magenta or red ink, examples of the pigment include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, and C.I. Pigment Red 224.

In the case where the non-aqueous ink composition of this embodiment is produced in the form of an orange or yellow ink, examples of the pigment include C.I. Pigment Orange 31, C.I. Pigment Orange 43, C.I. Pigment Orange 64, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, and C.I. Pigment Yellow 180.

In the case where the non-aqueous ink composition of this embodiment is produced in the form of a green or cyan ink, examples of the pigment include C.I. Pigment Blue 15, C.I. Pigment Blue 15:2, C.I. Pigment Blue 15:3, C.I. Pigment Blue 16, C.I. Pigment Blue 60, C.I. Pigment Green 7, and C.I. Pigment Green 36.

In the case where the non-aqueous ink composition of this embodiment is produced in the form of a black ink, examples of the pigment include carbon black (C.I. Pigment Black 7).

The above pigments may be used alone or in combination of two or more.

Among the above pigments, a pigment which exhibits small light resistance is used with the result that an effect in which light resistance is enhanced is effectively provided, and such a pigment is therefore preferably employed. The term "pigment which exhibits small light resistance" as used herein refers to a pigment which can be defined through the following analysis for the light resistance.

A printer (commercially available from Roland DG Corporation, type "SP-300V") is used, and the non-aqueous ink composition is applied onto a vinyl chloride-based resin (commercially available from 3M Company, product name "IJ-40") at 100% density in the manner of solid printing, thereby producing a specimen. A Xenon weather meter (commercially available from Suga Test Instruments Co., Ltd., type "XL75) is used to expose the specimen to ultraviolet light at an irradiation level of 70000 Lux for 500 hours, and an OD (optical density) value is then measured before and after the exposure. In the case where the decreasing rate of the OD value is larger than or equal to 30% and is less than 50%, the pigment contained in the non-aqueous ink composition is defined as the "pigment which exhibits small light resistance".

Examples of the "pigment which exhibits small light resistance" include C.I. Pigment Yellows 180, 185, and 155.

Although the amount of the pigment contained in the non-aqueous ink composition of this embodiment can be appropriately determined depending on application of the non-aqueous ink composition and depending on recording properties, the pigment is contained in an amount that is preferably in the range from 0.5 to 25% by mass, more preferably in the range from 0.5 to 15% by mass, further preferably in the range from 1 to 10% by mass.

1.4. Other Additives

The non-aqueous ink composition of this embodiment may appropriately contain an organic solvent other than the solvent represented by the formula 1 and may contain a surfactant, dispersant, or the like.

1.4.1. Other Organic Solvent

In order to firmly fix ink onto a recording medium such as a vinyl chloride-based resin, the non-aqueous ink composition of this embodiment preferably contains at least one material selected from an alkylene glycol compound and lactone which are each in a liquid phase at ordinary temperatures and pressures, and more preferably contains the alkylene glycol compound.

Preferable examples of the alkylene glycol compound include an ethylene glycol compound and a propylene glycol compound, each being disclosed in WO 2002/055619.

Preferable examples of the ethylene glycol compound include monoether and diether of ethylene glycol, diethylene glycol, triethylene glycol, tetraethylene glycol, or polyethylene glycol, and a diethylene glycol compound is preferably employed. Preferable examples of the propylene glycol compound include monoether and diether of propylene glycol, dipropylene glycol, tripropylene glycol, or polypropylene glycol, and a dipropylene glycol compound is preferably employed.

Examples of the diethylene glycol compound to be used include a diethylene glycol compound represented by the formula 3.

$$R^4\text{—O—}C_2H_4\text{—O—}C_2H_4\text{—O—}R^5 \quad (3)$$

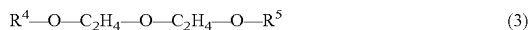

In the formula 3, $R^4$ and $R^5$ each independently represent a hydrogen atom, alkyl group having one to four carbon atoms, or $R^6CO$ group. $R^6$ is an alkyl group having one to four carbon atoms. The term "alkyl group having one to four carbon atoms" as used herein refers to an alkyl group having a straight-chin structure or branched structure. Examples of such an alkyl group include a methyl group, ethyl group, n-propyl group, iso-propyl group, n-butyl group, sec-butyl group, and tert-butyl group. Specific examples of the diethylene glycol compound represented by the formula 3 include diethylene glycol, diethylene glycol monomethyl ether, diethylene glycol dimethyl ether, diethylene glycol methyl ethyl ether, diethylene glycol monoethyl ether, diethylene glycol diethyl ether, diethylene glycol mono n-butyl ether, diethylene glycol di-n-butyl ether, diethylene glycol butyl methyl ether, diethylene glycol monoethyl ether acetate, and diethylene glycol mono-n-butyl ether acetate.

Examples of the dipropylene glycol compound to be used include a dipropylene glycol compound represented by the formula 4.

$$R^7\text{—O—}C_3H_6\text{—O—}C_3H_6\text{—O—}R^8 \quad (4)$$

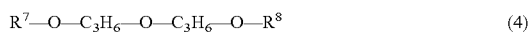

In the formula 4, $R^7$ and $R^8$ each independently represent a hydrogen atom, alkyl group having one to four carbon atoms, or $R^9CO$ group. $R^9$ is an alkyl group having one to four carbon atoms. The term "alkyl group having one to four carbon atoms" as used herein refers to an alkyl group having a straight-chin structure or branched structure. Examples of such an alkyl group include a methyl group, ethyl group, n-propyl group, iso-propyl group, n-butyl group, sec-butyl group, and tert-butyl group. Examples of the dipropylene glycol compound represented by the formula 4 include dipropylene glycol, dipropylene glycol monomethyl ether, and dipropylene glycol monoethyl ether.

Lactone having six or lower carbon atoms is preferably employed as the lactone of this embodiment, and β-propiolactone, β-butyrolactone, γ-butyrolactone, γ-valerolactone, and ε-caprolactone are more preferably employed.

The diethylene glycol compound, dipropylene glycol compound, and lactone which can be used for the non-aqueous ink composition of this embodiment each have a boiling point of preferably 150° C. or higher under ordinary pressure, more preferably 180° C. or higher.

The diethylene glycol compound and dipropylene glycol compound which can be used for the non-aqueous ink composition of this embodiment each exhibit a steam pressure of preferably 1 hPa or lower at a temperature of 20° C., more preferably 0.7 hPa or lower.

In the case where the diethylene glycol compound and dipropylene glycol compound which can each satisfy the above conditions of the high boiling point and low steam pressure are used, the necessity of providing a local exhausting system and exhaust-gas treatment system can be reduced. In addition, work environment can be improved, and environmental load can be also reduced.

The non-aqueous ink composition of this embodiment preferably contains the diethylene glycol compound. Although the amount of the diethylene glycol compound can be appropriately determined depending on printing properties, the diethylene glycol compound is contained in an amount that is preferably in the range from 30 to 90% by mass relative to the total mass of the non-aqueous ink composition.

In addition to the diethylene glycol compound, dipropylene glycol compound, lactone, or mixture thereof, the non-aqueous ink composition of this embodiment may further contain a polyethylene glycol monoether compound which is in a liquid phase at ordinary temperatures and pressures and which is represented by the formula 5.

$$R^{10}\text{—}(C_2H_4)_n\text{—}OR^{11} \quad (5)$$

In the formula 5, $R^{10}$ and $R^{11}$ each independently represent an alkyl group having one to six carbon atoms (preferably, alkyl group having one to four carbon atoms). Furthermore, n is an integer from 3 to 6. The term "alkyl group having one to six carbon atoms" as used herein refers to an alkyl group having a straight-chin structure or branched structure. For example, such an alkyl group may be the above "alkyl group having one to four carbon atoms" and may be a straight-chain or branched pentyl group or hexyl group.

The polyethylene glycol monoether compound which can be used for the non-aqueous ink composition of this embodiment has a boiling point of preferably 200° C. or higher under ordinary pressure, more preferably 250° C. or higher. The polyethylene glycol monoether compound has a flash point of preferably 100° C. or higher, more preferably 130° C. or higher. Use of such a polyethylene glycol monoether compound can impart volatilization-suppressing properties to the non-aqueous ink composition. For example, volatilization of the non-aqueous ink composition is suppressed in a tube through which the non-aqueous ink composition is supplied from an ink cartridge to an ink jet recording head, thereby being able to prevent or reduce deposition of the solid content of the non-aqueous ink composition in the tube.

Preferable examples of the polyethylene glycol monoether compound include triethylene glycol monoether compounds (for example, triethylene glycol monomethyl ether and triethylene glycol monobutyl ether) and mixtures with the polyethylene glycol monoether compound represented by the formula 5 in which n is an integer from four to six (specifically, polyethylene glycol monomethyl ether), such as a mixture with tetraethylene glycol monomethyl ether, pentaethylene glycol monomethyl ether, and hexaethylene glycol monomethyl ether.

The non-aqueous ink composition of this embodiment may contain the following organic solvents other than the above organic solvent.

Preferable examples of such other organic solvents include polar organic solvents such as alcohols (for example, methanol, ethanol, propyl alcohol, butyl alcohol, and fluorinated alcohol), ketones (for example, acetone, methyl ethyl ketone, and cyclohexanone), carboxylates (for example, methyl acetate, ethyl acetate, propyl acetate, butyl acetate, methyl propionate, and ethyl propionate), and ethers (for example, diethyl ether, dipropyl ether, tetrahydrofuran, and dioxane).

In the case where the non-aqueous ink composition of this embodiment contains at least any one of the diethylene glycol compound, dipropylene glycol compound, and lactone and does not contain the polyethylene glycol monoether compound, the total mass of the diethylene glycol compound, dipropylene glycol compound, and lactone preferably accounts for greater than or equal to 75% by mass of all of the organic solvent components.

In the case where the non-aqueous ink composition of this embodiment contains the polyethylene glycol monoether compound in addition to the diethylene glycol compound, dipropylene glycol compound, and lactone, the total mass of the diethylene glycol compound, dipropylene glycol compound, lactone, and polyethylene glycol monoether compound preferably accounts for greater than or equal to 80% by mass of all of the organic solvent components.

1.4.2. Surfactant

In order to decrease surface tension and then enhance the wettability of the non-aqueous ink composition to a recording medium, the non-aqueous ink composition of this embodiment may contain a silicone-based surfactant, fluorosurfactant, and nonionic surfactant such as polyoxyethylene derivative in addition to the above organic solvents.

Polyester-modified silicone and polyether-modified silicone are preferably used as the silicone-based surfactant. Specific examples of such surfactants include BYK-347 and 348 and BYK-UVs 3500, 3510, 3530, and 3570 (each being commercially available from BYK Japan KK).

A fluorine-modified polymer is preferably used as the fluorosurfactant, and examples of such a fluorosurfactant include BYK-340 (commercially available from BYE Japan KK).

An acetylene glycol-based surfactant is preferably used as the polyoxyethylene derivative. Specific examples of such an acetylene glycol-based surfactant include Surfynols 82, 104, 465, 485, and TG (each being commercially available from Air Products Japan, Inc.); Olfines STG and E1010 (each being commercially available from Nissin Chemical Industry Co., Ltd.); Nissan Nonions A-10R and A-13R (each being commercially available from NOF CORPORATION); FLOWLENs TG-740W and D-90 (each being commercially available from KYOEISHA CHEMICAL Co., LTD); and Noigen CX-100 (commercially available from Daiichi Kogyo Seiyaku Co., Ltd.).

The surfactant is contained in the non-aqueous ink composition of this embodiment in an amount that is preferably in the range from 0.05 to 3% by mass, more preferably 0.5 to 2% by mass.

1.4.3. Dispersant

The non-aqueous ink composition of this embodiment can contain an appropriate dispersant used for the traditional non-aqueous ink composition, thereby being able to enhance the dispersion stability of the pigment. A dispersant which effectively functions in the case where the organic solvent exhibits a solubility parameter that is in the range from 8 to 11 is preferably used as the dispersant of this embodiment. Specific examples of such a dispersant include polyester compounds such as Hinoacts KF1-M, T-6000, T-7000, T-8000, T-8350P, and T-8000E (each being commercially available from Takefu Fine Chemical Company); Solsperses 20000, 24000, 32000, 32500, 33500, 34000, 35200, and 37500 (each being commercially available from Lubrizol Corporation); Disperbyk-161, 162, 163, 164, 166, 180, 190, 191, and 192 (each being commercially available from BYK Japan KK); FLOWLENs DOPA-17, 22, 33, and G-700 (each being commercially available from KYOEISHA CHEMICAL Co., LTD); AJISPERs PB821 and PB711 (each being commercially available from Ajinomoto Fine-Techno Co., Inc.); and LP4010, LP4050, LP4055, and POLYMERs 400, 401, 402, 403, 450, 451, and 453 (each being commercially available from EFKA chemicals Company).

Although the amount of the dispersant contained in the non-aqueous ink composition of this embodiment can be appropriately determined depending on the pigment to be dispersed, the dispersant is contained in an amount that is preferably in the range from 5 to 200 parts by mass relative to 100 parts by mass of the pigment contained in the non-aqueous ink composition, more preferably in the range from 30 to 120 parts by mass.

1.4.4. Other Additives

The non-aqueous ink composition of this embodiment may further contain other additives which are contained in the traditional non-aqueous ink composition. Examples of such other additives include stabilizers, such as an antioxidant and ultraviolet absorber, and a binder resin.

Examples of the antioxidant include BHA (2,3-butyl-4-hydroxyanisole) and BHT (2,6-di-t-butyl-p-cresol). The antioxidant is contained in the non-aqueous ink composition of this embodiment in an amount that is preferably in the range from 0.01 to 3 weigh %.

Examples of the ultraviolet absorber include benzophenone compounds and benzotriazole compounds. The ultraviolet absorber is contained in the non-aqueous ink composition of this embodiment in an amount that is preferably in the range from 0.01 to 0.5 weigh %.

The binder resin may be added to the non-aqueous ink composition of this embodiment, thereby adjusting the viscosity of ink. Examples of the binder resin include acrylic resins, styrene acrylic resins, rosin-modified resins, phenolic resins, terpene resins, polyester resins, polyamide resins, epoxy resins, vinyl chloride-vinyl acetate copolymers, fibrous resins such as cellulose acetate butyrate, and vinyl-toluene-α-methylstyrene copolymers. These binder resins may be used alone or in combination of two or more. The binder resin is contained in an appropriate amount, thereby being able to contribute to further improving the fixing properties of ink with respect to a vinyl chloride-based resin.

1.4.5. Method for Producing Non-Aqueous Ink Composition

The non-aqueous ink composition of this embodiment can be produced by the well-known methods, and the following processes can be specifically employed. First, the solvent represented by the formula 1, polyvinyl chloride, and other organic solvents are weighed, and the resultant product is then stirred and mixed, thereby producing a mixed solvent. The mixed solvent is then partially retrieved, and the dispersant and pigment are added to the retrieved mixed solvent in sequence. A homogenizer is then used to grind the resultant product. A pigment dispersion liquid is subsequently prepared by using a ball mill, bead mill, ultrasonic mill, or jet mill so as to have desired ink characteristics. The rest of the mixed solvent and other additives (for example, surfactant and binder resin) are then added to the resultant pigment dispersion liquid while the pigment dispersion liquid is stirred, thereby being able to produce the non-aqueous ink composition.

1.4.6. Physical Properties

In view of balance between print quality and reliability of the ink jet ink composition, the non-aqueous ink composition of this embodiment exhibits a surface tension that is in the range from 20 to 50 mN/m at a temperature of 20° C., more preferably in the range from 25 to 40 mN/m. Meanwhile, surface tension is measured as follows: ink is applied onto a platinum plate in an atmosphere at a temperature of 20° C.; and Automatic Surface Tensiometer CBVP-Z (commercially available from Kyowa Interface Science Co., Ltd) is then used to measure surface tension on the platinum plate.

Furthermore, in terms of the same viewpoint, the non-aqueous ink composition of this embodiment has a viscosity that is preferably in the range from 2 mPa·s to 15 mPa·s at a temperature of 20° C., more preferably in the range from 2 mPa·s to 10 mPa·s. Meanwhile, viscosity can be measured as follows: a shear rate is increased from a level of 10 to a level of 1000 in an atmosphere at a temperature of 20° C.; viscoelastic analyzer MCR-300 (commercially available from Physica Messtechnik GmbH) is then used to read the viscosity at a shear rate of 200.

2. Ink Set

The ink set of this embodiment includes a plurality of non-aqueous ink compositions and includes at least one of the above non-aqueous ink compositions.

In the case where the ink set partially includes a non-aqueous ink composition containing a pigment which exhibits small light resistance, discoloration does not occur in the entire color of characters and images which are recorded on a recording medium by using the ink set, and discoloration occurs only in the color corresponding to the non-aqueous ink composition containing the pigment which exhibits small light resistance. Color balance is therefore significantly reduced. To the contrary, use of the non-aqueous ink composition of this embodiment enables the light resistance of the pigment to be enhanced. Even in the case where the ink-set partially includes the non-aqueous ink composition containing the pigment which exhibits small light resistance, the reduction of the color balance of characters and images which are recorded on a recording medium can be effectively suppressed.

3. Ink Jet Recording Method

In the ink jet recording method of this embodiment, a droplet of the non-aqueous ink composition is ejected and is then brought into adhering onto a surface of a recording medium containing a vinyl chloride-based resin, thereby recording an image. In the ink jet recording method of this embodiment, because the non-aqueous ink composition is used, ink can be securely ejected from an ink jet head with good stability, and the reduction of the color balance of characters and images which are recorded on a recording medium can be effectively suppressed.

The non-aqueous ink composition contains the solvent represented by the formula 1, and the solvent interacts with the vinyl chloride-based resin. The ink jet recording method of this embodiment therefore provides the following advantage: images are recorded as a result of bringing a droplet of the non-aqueous ink composition into adhering onto a surface of the recording medium containing the vinyl chloride-based resin, thereby firmly fixing the images onto the recording medium.

Any recording medium which contains the vinyl chloride-based resin can be used in the ink jet recording method of this embodiment, and examples of such a recording medium include a rigid or flexible vinyl chloride film or sheet. The non-aqueous ink of this embodiment enables images to be recorded on an untreated surface of the medium containing the vinyl chloride-based resin and therefore has an advantage in which use of an expensive recording medium, such as a traditional recording medium having an ink-receiving layer, is precluded. Meanwhile, the non-aqueous ink of this embodiment can be obviously applied to printing in which a surface-treated medium having the ink-receiving layer is used.

Although an ink jet recording apparatus used in the ink jet recording method of this embodiment is not specifically limited, a drop-on-demand-type ink jet recording apparatus is preferably used. The drop-on-demand-type ink jet recording apparatus is classified into several types including: an apparatus in which a piezoelectric ink jet technique is employed to perform recording by using a piezoelectric device provided to a recording head; and an apparatus in which a thermal ink jet technique is employed to perform recording by using the thermal energy released from a heater or the like of a resistive heating device provided to a recording head. Any type of the above apparatuses may be used in the recording method. The non-aqueous ink composition of this embodiment has an advantage in which the non-aqueous ink composition is inert to an ink-repellent surface of an ejection nozzle. The non-aqueous ink composition can be therefore advantageously used in an ink jet recording method in which a droplet of the non-aqueous ink composition is ejected from an ink jet recording head having an ejection nozzle with an ink-repellent surface.

4. Examples

Although embodiments of the invention will be hereinafter described in detail with reference to the following examples, embodiments of the invention are not limited to the following examples.

4.1. Synthesis of Solvent 4.1.1. Solvent A

N,N-dimethylacrylamide of 19.828 g and methanol of 6.408 g were supplied into a 300 ml separable flask having a stirrer, thermocouple, nitrogen gas-introducing pipe and were then stirred while nitrogen gas was introduced. Sodium-t-butoxide of 0.338 g was then added to the resultant product, and reaction subsequently progressed at a temperature of 35° C. for four hours. After the reaction, phosphoric acid of 150 mg was added to the produced solution to homogenize the solution, and the resultant solution was subsequently allowed to stand for three hours. The resultant solution was filtrated to remove precipitates, and an evaporator was then used to remove an unreacted material. Through these processes, a solvent A represented by the formula 6 was produced.

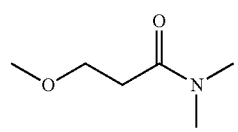

(6)

In the solvent A, an HLB value of 18.3 was obtained from the formula 2 based on an I/O value in an organic conceptual diagram.

4.1.2. Solvent B

N,N-dimethylacrylamide of 19.828 g and 1-butanol of 14.824 g were supplied into a 300 ml separable flask having a stirrer, thermocouple, nitrogen gas-introducing pipe and were then stirred while nitrogen gas was introduced. Sodium-t-butoxide of 0.338 g was then added to the resultant product, and reaction subsequently progressed at a temperature of 35° C. for four hours. After the reaction, phosphoric acid of 150 mg was added to the produced solution to homogenize the solution, and the resultant solution was subsequently allowed to stand for three hours. The resultant solution was filtrated to remove precipitates, and an evaporator was then used to remove an unreacted material. Through these processes, a solvent B represented by the formula 7 was produced.

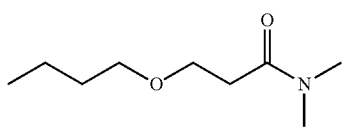

(7)

In the solvent B, an HLB value of 12.2 was obtained from the formula 2 based on an I/O value in an organic conceptual diagram.

4.1.3. Solvent C

N,N-dimethylacrylamide of 25.441 g and methanol of 6.408 g were supplied into a 300 ml separable flask having a stirrer, thermocouple, nitrogen gas-introducing pipe and were then stirred while nitrogen gas was introduced. Sodium-t-butoxide of 0.338 g was then added to the resultant product, and reaction subsequently progressed at a temperature of 35° C. for four hours. After the reaction, phosphoric acid of 150 mg was added to the produced solution to homogenize the solution, and the resultant solution was subsequently allowed to stand for three hours. The resultant solution was filtrated to remove precipitates, and an evaporator was then used to remove an unreacted material. Through these processes, a solvent C represented by the formula 8 was produced.

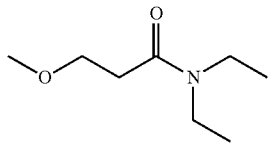

(8)

In the solvent C, an HLB value of 13.8 was obtained from the formula 2 based on an I/O value in an organic conceptual diagram.

4.1.4. Solvent D

N,N-dimethylacrylamide of 19.828 g and 1-hexanol of 20.434 g were supplied into a 300 ml separable flask having a stirrer, thermocouple, nitrogen gas-introducing pipe and were then stirred while nitrogen gas was introduced. Sodium-t-butoxide of 0.338 g was then added to the resultant product, and reaction subsequently progressed at a temperature of 35° C. for four hours. After the reaction, phosphoric acid of 150 mg was added to the produced solution to homogenize the solution, and the resultant solution was subsequently allowed to stand for three hours. The resultant solution was filtrated to remove precipitates, and an evaporator was then used to remove an unreacted material. Through these processes, a solvent D represented by the formula 9 was produced.

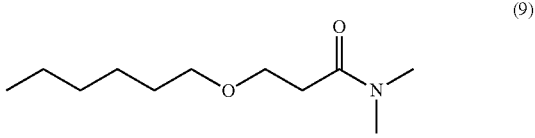

(9)

In the solvent D, an HLB value of 10.0 was obtained from the formula 2 based on an I/O value in an organic conceptual diagram.

4.1.5. Solvent E

N,N-dimethylacrylamide of 19.828 g and 2-ethylhexanol of 26.046 g were supplied into a 300 ml separable flask having a stirrer, thermocouple, nitrogen gas-introducing pipe and were then stirred while nitrogen gas was introduced. Sodium-t-butoxide of 0.338 g was then added to the resultant product, and reaction subsequently progressed at a temperature of 35° C. for four hours. After the reaction, phosphoric acid of 150 mg was added to the produced solution to homogenize the solution, and the resultant solution was subsequently allowed to stand for three hours. The resultant solution was filtrated to remove precipitates, and an evaporator was then used to remove an unreacted material. Through these processes, a solvent E represented by the formula 10 was produced.

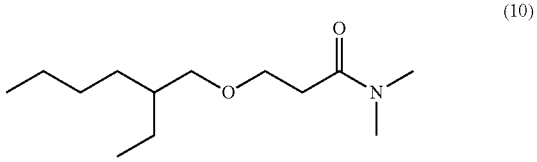 [SMILES: CCCCC(CC)COCCC(=O)N(C)C]

(10)

In the solvent E, an HLB value of 8.5 was obtained from the formula 2 based on an I/O value in an organic conceptual diagram.

4.1.6. Solvent F

N,N-dimethylacrylamide of 19.828 g and 1-octanol of 26.046 g were supplied into a 300 ml separable flask having a stirrer, thermocouple, nitrogen gas-introducing pipe and were then stirred while nitrogen gas was introduced. Sodium-t-butoxide of 0.338 g was then added to the resultant product, and reaction subsequently progressed at a temperature of 35° C. for four hours. After the reaction, phosphoric acid of 150 mg was added to the produced solution to homogenize the solution, and the resultant solution was subsequently allowed to stand for three hours. The resultant solution was filtrated to remove precipitates, and an evaporator was then used to remove an unreacted material. Through these processes, a solvent F represented by the formula 11 was produced.

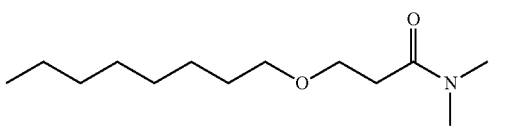

(11)

In the solvent F, an HLB value of 8.5 was obtained from the formula 2 based on an I/O value in an organic conceptual diagram.

4.2. Preparation of Non-Aqueous Ink Composition

The solvents and polyvinyl chloride were individually supplied into vessels corresponding to individual inks in amounts equivalent to concentrations listed in Tables 1 to 3, and magnetic stirrer was used to mix and stir the products in the individual vessels for 30 minutes, thereby producing mixed solvents.

Each of the mixed solvents was partially retrieved, and Solsperse 37500 (product name, commercially available from Lubrizol Corporation) and C.I. Pigment Yellow 180 [product name "PV FAST YELLOW HG", commercially available from Clariant (Japan) K.K.] were added to the retrieved mixed solvent in certain amounts. The resultant product was then ground by using a homogenizer. The resultant product was subsequently subjected to dispersion treatment by using a bead mill which was filled with zirconium beads each having a diameter of 0.3 mm, thereby producing a pigment dispersion liquid.

The rest of the mixed solvent and BYK-340 (fluorosurfactant, commercially available from BYK Japan KK) were added to the produced pigment dispersion liquid, and the resultant product was then mixed and stirred for an hour. The resultant product was filtrated with a membrane filter made of polytetrafluoroethylene (PTFE) and having an aperture size of 5 µm, thereby producing the yellow ink compositions listed in Tables 1 to 3. Meanwhile, the values in Tables 1 to 3 are described on the basis of a % by mass unit.

In Tables, the following materials were used. C.I. Pigment Yellow 180 [product name "PV FAST YELLOW HG", yellow pigment commercially available from Clariant (Japan) K.K.];
Solsperse 37500 (product name, dispersant commercially available from Lubrizol Corporation);
Diethylene glycol diethyl ether (product name, solvent commercially available from NIPPON NYUKAZAI CO., LTD.);
Diethylene glycol dimethyl ether (product name, solvent commercially available from NIPPON NYUKAZAI CO., LTD.);
Polyvinyl chloride A (product name "Kanevinyl S-400", commercially available from KANEKA CORPORATION, and average polymerization degree of 480);
Polyvinyl chloride B (product name "Kanevinyl S-1001N", commercially available from KANEKA CORPORATION, and average polymerization degree of 1050);
Dimethyl sulfoxide (product name, solvent commercially available from KANTO CHEMICAL CO., INC.);
Sulfolan (product name, solvent commercially available from KANTO CHEMICAL CO., INC.);
N-methylpyrrolidone (product name, solvent commercially available from KANTO CHEMICAL CO., INC.);
BYK-340 (product name, fluorosurfactant commercially available from BYK Japan KK);
Additive 1 2-(2H-benzotriazole-2-yl)-4-methylphenol (product name "KEMISORB 71", commercially available from Chemipro Kasei Kaisha, Ltd.);
Additive 2 2,4-dihydroxybenzophenone (product name "KEMISORB 10", commercially available from Chemipro Kasei Kaisha, Ltd.);
Additive 3 2-[4,6-bis(2,4-dimethylphenyl)-1,3,5-triazine-2-yl]-5-(octyloxy)-phenol (product name "KEMISORB 102", commercially available from Chemipro Kasei Kaisha, Ltd.);
Additive 4 3,5-di-tert-butyl-4-hydroxybenzoate-2,4-di-tert-butylphenyl (product name "KEMISORB 112", commercially available from Chemipro Kasei Kaisha, Ltd.); and
Additive 5 bis(1,2,2,6,6-pentamethyl-4-piperidyl)sebacate (product name "KEMISTAB 29", commercially available from Chemipro Kasei Kaisha, Ltd.).

4.3. Evaluation Test of Non-Aqueous Ink Composition
4.3.1. High-Frequency Response Test A head provided to a printer (commercially available from Roland DG Corporation, type "SP-300V") was used, and a head-driving frequency was changed. In each level of the changed frequency, a state in which an ejected ink droplet flied was analyzed to evaluate the following items: the shape of the droplet; presence or absence of defective ejection; and securely satisfying these items even in the case of continuous ejection (ejection stability). Frequency at which all of the evaluation items were satisfied was then obtained. The evaluation results are listed in Tables 1 to 3.

4.3.2. Nozzle Clogging Test

The head provided to a printer (commercially available from Roland DG Corporation, type "SP-300V") was filled with individual inks and was then allowed to stand at a room temperature of 25° C. at a 45% relative humidity (RH). In this case, the printer had been preliminarily set so as not to perform periodic cleaning with a timer during being allowed to stand. Nozzle check was performed every week after the printer had started to be allowed to stand, and an evaluation criterion was defined as the last week in which a nozzle check pattern was smoothly printed without performing manual nozzle cleaning. In this case, the evaluation was performed up to eight weeks. The evaluation results are listed in Tables 1 to 3.

4.3.3. Light Resistance Test

The printer (commercially available from Roland DG Corporation, type "SP-300V") was used, and the non-aqueous ink compositions were each applied on a vinyl chloride-based resin (commercially available from 3M Company, product name "IJ-40") at 100% density in the manner of solid printing, thereby producing a specimen. A Xenon weather meter (commercially available from Suga Test Instruments Co., Ltd., type "XL75") was used to expose the specimen to ultraviolet light at an irradiation level of 70000 Lux for 500 hours, and an OD value was then measured before and after the exposure. The following evaluation criteria were employed on the basis of the decreasing rate of the OD value before and after the exposure. The evaluation results were listed in Tables 1 to 3.
A: the decreasing rate of the OD value was less than 20%;
B: the decreasing rate of the OD value was 20% or higher and was less than 30%; and
C: the decreasing rate of the OD value was 30% or higher and was less than 50%.

4.3.4. Ozone Resistance Test

A specimen was produced as in the manner the same as that in the section "4.3.3. Light Resistance Test". An Ozone Weather Meter (commercially available from Suga Test Instruments Co., Ltd., type "OMS-H") was used to expose the specimen to ozone with a concentration of 20 ppm under conditions of a temperature of 24° C. and a 64% RH. After passage of 240 hours from the start of the exposure, a concentration meter (registered trademark "Spectrolino", commercially available from GretagMacbeth Corporation) was used to measure the OD value of color recorded in each specimen. In measurement conditions, a D50 light source was employed, and a view angle was set to 2°. In the measurement, only a filter condition was changed for every color (a Red filter was used for cyan, a Green filter was used for magenta, a Blue filter was used for yellow, and a filter is not used for black). A residual optical density (ROD) value was obtained from the formula 12 based on the measurement results.

$$ROD(\%) = (D/D0) \times 100 \quad (12)$$

(in the formula 12, D represents the OD value after the exposure test, and D0 represents the OD value before the exposure test).

The following evaluation criteria were employed on the basis of the ROD value. The evaluation results are listed in Tables 1 to 3.
A: the ROD value was 90% or higher;
B: the ROD value was 70% or higher and was less than 90%; and
C: the ROD value was less than 70%.

TABLE 1

| | Material | Example 1 | Example 2 | Example 3 | Example 4 | Example 5 | Example 6 | Example 7 | Example 8 |
|---|---|---|---|---|---|---|---|---|---|
| Pigment | C.I. Pigment Yellow 180 | 4.00 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 | 4.00 |
| Resin | Polyvinyl chloride A | 0.08 | | 0.08 | | 0.08 | | 0.08 | |
| | Polyvinyl chloride B | | 0.08 | | 0.08 | | 0.08 | | 0.08 |
| Solvent | Diethylene glycol diethyl ether | 57.92 | 57.92 | 57.92 | 57.92 | 57.92 | 57.92 | 57.92 | 57.92 |
| | Diethylene glycol dimethyl ether | 30.00 | 30.00 | 30.00 | 30.00 | 30.00 | 30.00 | 30.00 | 30.00 |
| | Solvent A | 2.00 | 2.00 | | | | | | |
| | Solvent B | | | 2.00 | 2.00 | | | | |
| | Solvent C | | | | | 2.00 | | | |
| | Solvent D | | | | | | 2.00 | | |
| | Solvent E | | | | | | | 2.00 | |
| | Solvent F | | | | | | | | 2.00 |
| Surfactant | BYK-340 | 2.00 | 2.00 | 2.00 | 2.00 | 2.00 | 2.00 | 2.00 | 2.00 |
| Total amount | | 100.00 | 100.00 | 100.00 | 100.00 | 100.00 | 100.00 | 100.00 | 100.00 |
| High-frequency response test (kHz) | | 45 | 45 | 45 | 45 | 45 | 45 | 45 | 45 |
| Nozzle clogging test | | 5 | 5 | 5 | 5 | 5 | 5 | 5 | 5 |
| Light resistance test | | B | B | B | B | B | B | B | B |
| Ozone resistance test | | B | B | B | B | B | B | B | B |

TABLE 2

| | Material | Comparison example 1 | Comparison example 2 | Comparison example 3 | Comparison example 4 | Comparison example 5 | Comparison example 6 | Comparison example 7 | Comparison example 8 | Comparison example 9 | Comparison example 10 | Comparison example 11 | Comparison example 12 |
|---|---|---|---|---|---|---|---|---|---|---|---|---|---|
| Pigment | C.I. Pigment Yellow 180 | 4.00 | 4.00 | 4.00 | 4.00 | 4.00 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 | 4.00 | 4.00 | 4.00 | 4.00 | 4.00 |
| Resin | Polyvinyl chloride A | 0.08 | | | 0.08 | 0.08 | 0.08 | 5.00 | 5.00 | 5.00 | | | |
| | Polyvinyl chloride B | | | | | | | | | | 5.00 | 5.00 | 5.00 |
| Solvent | Diethylene glycol diethyl ether | 59.92 | 58.00 | 58.00 | 57.92 | 57.92 | 57.92 | 25.00 | 25.00 | 25.00 | 25.00 | 25.00 | 25.00 |
| | Diethylene glycol dimethyl ether | 30.00 | 30.00 | 30.00 | 30.00 | 30.00 | 30.00 | 30.00 | 30.00 | 30.00 | 30.00 | 30.00 | 30.00 |
| | Solvent A | | 2.00 | | | | | | | | | | |
| | Solvent B | | | 2.00 | | | | | | | | | |
| | Dimethyl sulfoxide | | | | 2.00 | | | 30.00 | | | 30.00 | | |
| | Sulfolan | | | | | 2.00 | | | 30.00 | | | 30.00 | |
| | N-methylpyrrolidone | | | | | | 2.00 | | | 30.00 | | | 30.00 |
| Surfactant | BYK-340 | 2.00 | 2.00 | 2.00 | 2.00 | 2.00 | 2.00 | 2.00 | 2.00 | 2.00 | 2.00 | 2.00 | 2.00 |
| Total amount | | 100.00 | 100.00 | 100.00 | 100.00 | 100.00 | 100.00 | 100.00 | 100.00 | 100.00 | 100.00 | 100.00 | 100.00 |
| High-frequency response test (kHz) | | 35 | 45 | 45 | 35 | 35 | 35 | 35 | 35 | 35 | 35 | 35 | 35 |
| Nozzle clogging test | | 2 | 8 | 8 | 3 | 3 | 3 | 1 | 1 | 1 | 1 | 1 | 1 |
| Light resistance test | | C | C | C | B | B | B | A | A | A | A | A | A |
| Ozone resistance test | | B | C | C | B | B | B | B | B | B | B | B | B |

TABLE 3

| | Material | Example 9 | Example 10 | Example 11 | Example 12 | Example 13 | Example 14 | Comparison example 13 | Comparison example 14 | Comparison example 15 | Comparison example 16 | Comparison example 17 |
|---|---|---|---|---|---|---|---|---|---|---|---|---|
| Pigment | C.I. Pigment Yellow 180 | 4.00 | 4.00 | 4.00 | 4.00 | 4.00 | 4.00 | 4.00 | 4.00 | 4.00 | 4.00 | 4.00 |
| Dispersant | Solsperse 37500 | 4.00 | 4.00 | 4.00 | 4.00 | 4.00 | 4.00 | 4.00 | 4.00 | 4.00 | 4.00 | 4.00 |
| Resin | Polyvinyl chloride A | 0.08 | | 5.00 | | 5.00 | | | | | | |
| | Polyvinyl chloride B | | 0.08 | | 5.00 | | 5.00 | | | | | |
| Solvent | Diethylene glycol diethyl ether | 49.20 | 49.20 | 25.00 | 25.00 | 5.00 | 5.00 | 49.00 | 50.00 | 50.00 | 50.00 | 50.00 |
| | Diethylene glycol dimethyl ether | 30.00 | 30.00 | 30.00 | 30.00 | 30.00 | 30.00 | 30.00 | 29.00 | 29.00 | 29.00 | 29.00 |
| | Solvent A | 10.00 | 10.00 | 30.00 | 30.00 | 50.00 | 50.00 | 10.00 | 10.00 | 10.00 | 10.00 | 10.00 |

TABLE 3-continued

| Material | | Example 9 | Example 10 | Example 11 | Example 12 | Example 13 | Example 14 | Comparison example 13 | Comparison example 14 | Comparison example 15 | Comparison example 16 | Comparison example 17 |
|---|---|---|---|---|---|---|---|---|---|---|---|---|
| Additive | Additive 1 | | | | | | | 1.00 | | | | |
| | Additive 2 | | | | | | | | 1.00 | | | |
| | Additive 3 | | | | | | | | | 1.00 | | |
| | Additive 4 | | | | | | | | | | 1.00 | |
| | Additive 5 | | | | | | | | | | | 1.00 |
| Surfactant | BYK-340 | 2.00 | 2.00 | 2.00 | 2.00 | 2.00 | 2.00 | 2.00 | 2.00 | 2.00 | 2.00 | 2.00 |
| Total amount | | 100.00 | 100.00 | 100.00 | 100.00 | 100.00 | 100.00 | 100.00 | 100.00 | 100.00 | 100.00 | 100.00 |
| High-frequency response test (kHz) | | 45 | 45 | 45 | 45 | 45 | 45 | 45 | 45 | 45 | 45 | 45 |
| Nozzle clogging test | | 5 | 5 | 5 | 5 | 5 | 5 | 5 | 5 | 5 | 5 | 5 |
| Light resistance test | | A | A | A | A | A | A | B | B | B | B | B |
| Ozone resistance test | | A | A | A | A | A | A | C | C | C | C | C |

4.3.5. Evaluation Results

In the examples 1 to 8, at least any one of the solvents A to F was contained, thereby being able to obtain sufficient results in the high-frequency response test and nozzle clogging test and secure good ejection stability. Furthermore, any one of the solvents A to F was used in combination with the polyvinyl chloride, thereby being able to enhance the light resistance and ozone resistance of the pigment.

In the examples 9 to 14, the results approximately the same as those of the examples 1 to 8 were obtained. In this case, comparing these results with the results of the examples 1 to 8, the increase of the additive amount of the polyvinyl chloride enabled the light resistance and ozone resistance of the pigment to be further enhanced.

In the comparison example 1, the solvents A to F were not contained, and a sufficient result could not be therefore obtained in the high-frequency response test. The solvents A to F were not contained with the result that the polyvinyl chloride A could not be sufficiently dissolved in the ink, and good results could not be therefore obtained in the nozzle clogging test, light resistance test, and ozone resistance test.

In the comparison examples 2 and 3, because the solvent A or B was contained, sufficient results were obtained in the high-frequency response test and nozzle clogging test, and good ejection stability could be therefore secured. On the other hand, because the polyvinyl chloride was not contained, the light resistance and ozone resistance of the pigment could not be enhanced.

In the comparison examples 4 to 12, because at least any one of dimethyl sulfoxide, sulfolan, and N-methylpyrrolidone was used in place of the solvents A to F, sufficient results could not be obtained in the high-frequency response test and the nozzle clogging test. It was accordingly found that the solvents A to F more advantageously served to secure ink ejection stability than the other solvents.

In the comparison examples 13 to 17, the additives 1 to 5 which served as an ultraviolet absorber were contained, and excellent light resistance was therefore exhibited. On the other hand, polyvinyl chloride was not contained, and sufficient results were not therefore obtained in the ozone resistance test.

In the examples and comparison examples, even if any type of solvents was used, the addition of the polyvinyl chloride caused the increased occurrence frequency of the nozzle clogging, as compared with the case in which the polyvinyl chloride was not added. In the case where the solvent A or B was used, however, the increase of the additive amount of the polyvinyl chloride less affected the occurrence frequency of the nozzle clogging. It is believed that this phenomenon was generated for the reason that the solubility of the polyvinyl chloride to the solvent A or B was higher than those of the other solvents.

4.4. Production of Ink Set

In the manner the same as that in the section "4.2. Preparation of Non-aqueous Ink Composition" except that the types of the pigment were changed, the non-aqueous ink compositions of four colors including yellow, magenta, cyan, and black were prepared as listed in Table 4. Two ink sets individually including the non-aqueous ink compositions of the four colors were produced. Meanwhile, the values in Table 4 are described on the basis of a % by mass unit.

In Table 4, the following materials were used. C.I. Pigment Yellow 180 [product name "PV FAST YELLOW HG", yellow pigment commercially available from Clariant (Japan) K.K.];

C.I. Pigment Red 122 (product name "LIONOGEN Magenta R", magenta pigment commercially available from TOYO INK CO., LTD);

C.I. Pigment Blue 15:3 (product name "cyanine blue 4920", cyan pigment commercially available from Dainichiseika Color & Chemicals Mfg. Co., Ltd.); and C.I. Pigment Black 7 (product name "MA-7", black pigment commercially available from Mitsubishi Chemical Corporation). The other components were the same as the above, and description of the other components is therefore omitted.

TABLE 4

| | Material | Ink set (Example 15) | | | | Ink set (Comparison example 18) | | | |
|---|---|---|---|---|---|---|---|---|---|
| Pigment | C.I. Pigment Yellow 180 | 4.00 | | | | 4.00 | | | |
| | C.I. Pigment Red 122 | | 5.00 | | | | 5.00 | | |
| | C.I. Pigment Blue 15:3 | | | 3.70 | | | | 3.70 | |
| | C.I. Pigment Black 7 | | | | 4.40 | | | | 4.40 |
| Dispersant | Solsperse 37500 | 4.00 | 4.00 | 4.00 | 4.00 | 4.00 | 4.00 | 4.00 | 4.00 |
| Resin | Polyvinyl chloride B | 0.80 | 0.80 | 0.80 | 0.80 | | | | |

TABLE 4-continued

| | Material | Ink set (Example 15) | | | | Ink set (Comparison example 18) | | | |
|---|---|---|---|---|---|---|---|---|---|
| Solvent | Diethylene glycol diethyl ether | 49.20 | 49.20 | 49.20 | 49.20 | 50.00 | 50.00 | 50.00 | 50.00 |
| | Diethylene glycol dimethyl ether | 30.00 | 29.00 | 30.30 | 29.60 | 30.00 | 29.00 | 30.30 | 29.60 |
| | Solvent A | 10.00 | 10.00 | 10.00 | 10.00 | 10.00 | 10.00 | 10.00 | 10.00 |
| Surfactant | BYK-340 | 2.00 | 2.00 | 2.00 | 2.00 | 2.00 | 2.00 | 2.00 | 2.00 |
| Total amount | | 100.00 | 100.00 | 100.00 | 100.00 | 100.00 | 100.00 | 100.00 | 100.00 |
| Light resistance evaluation | | A | A | A | A | C | C | C | C |
| Ozone resistance evaluation | | A | A | A | A | C | C | C | C |
| Color balance evaluation | | A | | | | C | | | |

4.5. Evaluation Test of Ink Set 4.5.1. Evaluation of Reliability of Ink Set

The light resistance and ozone resistance of individual colors were evaluated in the manners the same as those in the sections "4.3.3. Light Resistance Test" and "4.3.4. Ozone Resistance Test". On the basis of the evaluation results of the light resistance test and ozone resistance test, the following criteria for evaluating the reliability of the ink set were employed. The evaluation results are listed in Table 4.

A: the inks of the four colors all marked the grade A in the evaluation results of the light resistance test and ozone resistance test;

B: at least one of the inks of the four colors marked the grade B in the evaluation results of the light resistance test and ozone resistance test, and the others marked the grade A; and C: at least one of the inks of the four colors marked the grade C in the evaluation results of the light resistance test and ozone resistance test, and the others marked the grade A or B.

4.5.2. Evaluation Results

In the example 15, the ink set had excellent reliability. In contrast, in the comparison example 18, the ink set had insufficient reliability. In the case where the ink set had insufficient reliability, a problem arose in recording an image of secondary or higher color, particularly such as green. For example, in the case where only yellow color degradation occurred in printing a green image, color balance in the image was significantly reduced. In the ink set of embodiments of the invention, excellent reliability was exhibited as described above, and the color balance in a recorded image could be therefore held.

Embodiments of the invention are not limited to the above embodiments and can be variously modified. Embodiments of the invention may include, for example, configurations substantially the same as those described in the above embodiments (for example, configurations having the same functions, processes, and results or having the same objects and advantageous effects as those in the above embodiments). In addition, embodiments of the invention may include configurations provided by changing non-essential parts of the configurations described in the above embodiments. Furthermore, embodiments of the invention may include configurations which can provide the effects the same as those described in the above embodiments or which can provide the advantages the same as those in the above embodiments. Still furthermore, embodiments of the invention may include configurations in which a well-known technique is added to the configurations described in the above embodiments.

What is claimed is:

1. An ink jet recording-targeted non-aqueous ink composition comprising:
    a pigment;
    a polyvinyl chloride; and
    a solvent represented by the formula 1,

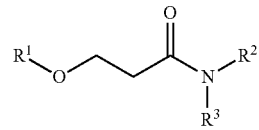

(1)

wherein $R^1$ represents an alkyl group having one to eight carbon atoms, and $R^2$ and $R^3$ each represent any one of a methyl group and an ethyl group;
   the pigment is at least one selected from the group consisting of C.I. pigment yellow 180, 185 and 155; and
   the polyvinyl chloride and the solvent represented by the formula 1 are contained in a mass ratio that is in the range from 1:5 to 1:25.

2. The ink jet recording-targeted non-aqueous ink composition according to claim 1, wherein $R^1$ in the formula 1 which represents the solvent is any one of a methyl group and an n-butyl group.

3. The ink jet recording-targeted non-aqueous ink composition according to claim 1, wherein the solvent represented by the formula 1 is contained in an amount that is in the range from 2 to 50% by mass.

4. The ink jet recording-targeted non-aqueous ink composition according to claim 1, wherein the polyvinyl chloride is contained in an amount that is in the range from 0.05 to 5% by mass.

5. An ink set which includes a plurality of ink jet recording-targeted non-aqueous ink compositions, the ink set comprising at least one ink jet recording-targeted non-aqueous ink composition according to claim 1.

6. An ink jet recording method comprising:
    ejecting a droplet of the ink jet recording-targeted non-aqueous ink composition according to claim 1; and
    bringing the droplet into adhering onto a surface of a recording medium containing a vinyl chloride-based resin with the result that an image is recorded.

7. The ink composition of claim 1, wherein the pigment includes a mixture of C.I. pigment yellow 180, 185 and 155.

* * * * *